US012757216B2

(12) United States Patent
Vivanco et al.

(10) Patent No.: US 12,757,216 B2
(45) Date of Patent: Oct. 6, 2026

(54) SYSTEMS AND METHODS FOR OPTIMIZING MICRO-SLEEP CYCLES OF USER EQUIPMENT FOR ENERGY SAVINGS

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); Yupeng Jia, South Pasadena, CA (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 253 days.

(21) Appl. No.: 18/769,010

(22) Filed: Jul. 10, 2024

(65) Prior Publication Data

US 2026/0020037 A1 Jan. 15, 2026

(51) Int. Cl.

| | |
|---|---|
| ***H04W 72/231*** | (2023.01) |
| ***H04W 52/02*** | (2009.01) |
| ***H04W 72/0446*** | (2023.01) |
| ***H04W 72/12*** | (2023.01) |

(52) U.S. Cl.

CPC ..... *H04W 72/231* (2023.01); *H04W 52/0216* (2013.01); *H04W 72/0446* (2013.01); *H04W 72/12* (2013.01)

(58) Field of Classification Search

CPC ........... H04W 72/231; H04W 52/0216; H04W 72/0446; H04W 72/12; H04W 72/232; Y02D 30/70

See application file for complete search history.

(56) References Cited

U.S. PATENT DOCUMENTS

| | | | | |
|---|---|---|---|---|
| 2016/0119969 | A1* | 4/2016 | Vajapeyam | H04W 24/10 370/329 |
| 2022/0159702 | A1* | 5/2022 | Seo | H04L 5/0094 |
| 2022/0312440 | A1* | 9/2022 | Bagheri | H04W 72/044 |
| 2023/0388170 | A1* | 11/2023 | He | H04W 72/0446 |

* cited by examiner

*Primary Examiner* — Austin J Moreau

(74) *Attorney, Agent, or Firm* — GUNTIN & GUST, PLC; Miyoung Shin

(57) ABSTRACT

Aspects of the subject disclosure may include, for example, determining a slot offset value for a target user equipment (UE) based on an application running on the target UE, where the slot offset value is elastic, providing the slot offset value to an access network equipment serving the target UE, and mandating the access network equipment to buffer downlink data during the determined slot offset value and schedule to send to the target UE the downlink data in clusters after the determined slot offset value. Other embodiments are disclosed.

20 Claims, 14 Drawing Sheets

240

230

240

250

300

600

SYSTEMS AND METHODS FOR OPTIMIZING MICRO-SLEEP CYCLES OF USER EQUIPMENT FOR ENERGY SAVINGS

FIELD OF THE DISCLOSURE

The subject disclosure relates to systems and methods for optimizing micro-sleep cycles of user equipment for energy savings over wireless communication networks.

BACKGROUND

Cross-slot scheduling is available as a user equipment (UE) power saving technique. The UE is allowed to perform micro-sleep cycles and reduce Physical Downlink Control Channel (PDCCH) processing which may yield to reducing UE power consumption. The cross-slot scheduling has been introduced through 5G Release-16 of the 3rd Generation Partnership Project (3GPP), i.e., 3GPP TR 38.840 V16.0.0 (2019 June).

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for systems and methods for optimizing micro-sleep cycles of user equipment for energy savings. The systems and methods determine a slot offset parameter or value based on a type of user equipment and/or a type of application, thereby utilizing elastic slot offset parameters or values as needed and optimizing micro-sleep cycles of the UE based on the elastic slot offset parameters or values. Other embodiments are described in the subject disclosure.

One or more aspects of the subject disclosure are directed to a device including a processing system including a processor and a memory that stores executable instructions that, when executed by the processing system, facilitate performance of operations. The operations include determining a slot offset value for a target user equipment (UE) based on an application running on the target user equipment, wherein the slot offset value is elastic, providing the slot offset value to an access network equipment serving the target UE, and mandating the access network equipment to buffer downlink data during the determined slot offset value and schedule to send to the target UE the downlink data in clusters after the determined slot offset value.

One or more aspects of the subject disclosure are directed to a non-transitory machine-readable medium, comprising executable instructions that, when executed by a processing system of an access network equipment including a processor, facilitate performance of operations. The operations include receiving a slot offset parameter, wherein the slot offset parameter is configured to vary based on a type of user equipment (UE), a type of application, or both, sending downlink control information (DCI) to a user equipment via PDCCH, wherein the DCI includes the slot offset parameter, and sending data in clusters to the UE by buffering the data for a time period corresponding to the slot offset parameter.

One or more aspects of the subject disclosure are directed to a method includes receiving, by a processing system of user equipment including a processor, from a network counterpart, a downlink control information (DCI) including a slot offset parameter, monitoring, by the processing system, the DCI to check a data grant indicator and the slot offset parameter, and entering, by the processing system, into a micro-sleep cycle during a time period corresponding to the slot offset parameter.

Figure 1:
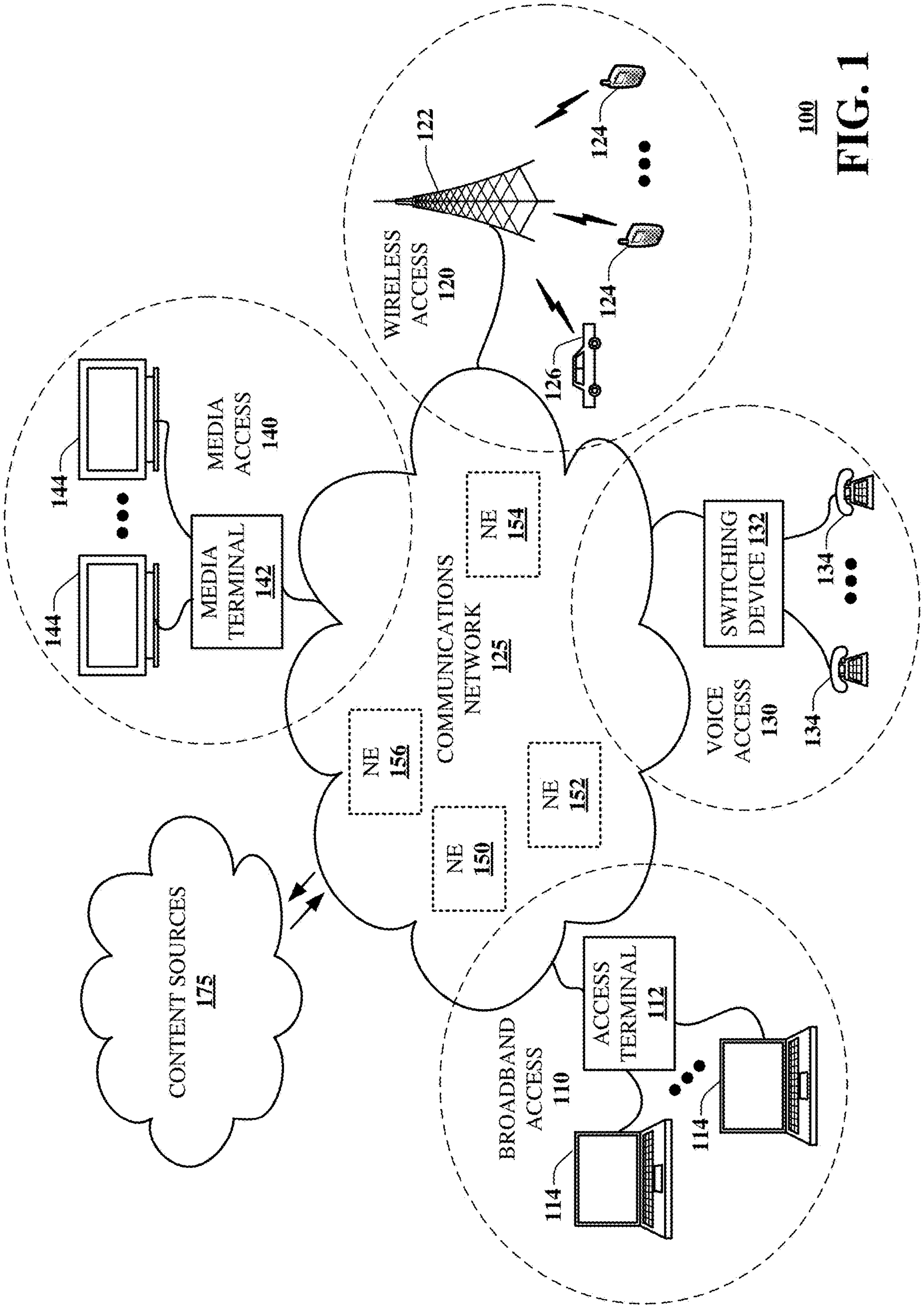
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part systems and methods for optimizing micro-sleep cycles of user equipment for energy savings. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
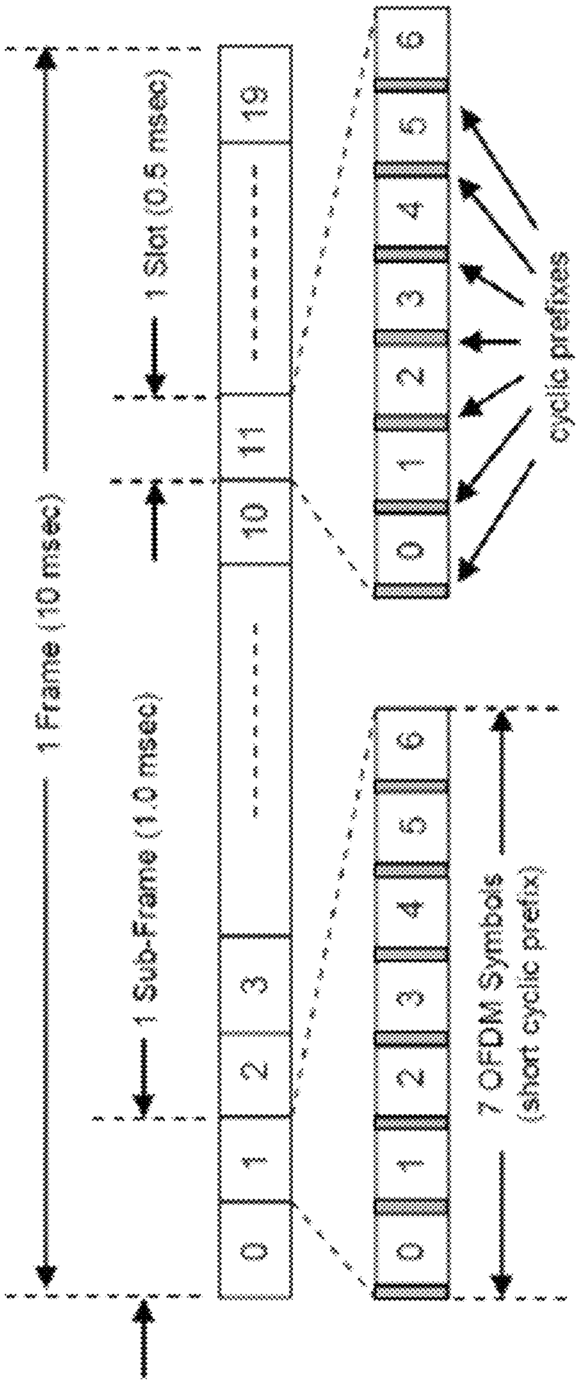
FIG. 2A illustrates a standard LTE/5G frame structure according to the 3GPP standard.

FIG. 2A illustrates a standard LTE/5G frame structure according to the 3GPP standard. One radio frame includes 10 subframes and 20 slots, as each subframe includes two slots, which is depicted in FIG. 2A. One radio frame corresponds to 10 ms, each subframe corresponds to 1 ms, and each slot corresponds to 0.5 ms. Each slot includes 7 OFM symbols separated by a short cyclic prefix. Each symbol is 0.071428 ms (0.5/7) in length. In 5G networks, the frame structure can be flexibly configured to adjust a duration of each time slot, such as configuring to have a longer slot or a shorter slot to address needs for a quicker response time, etc. The slot duration also changes based on subcarrier spacing, such as the slot duration getting shorter as subcarrier spacing gets wider. For instance, the slot duration in FIG. 2A is 0.5 ms as the subcarrier spacing is 30 kHz.

Figure 2B:
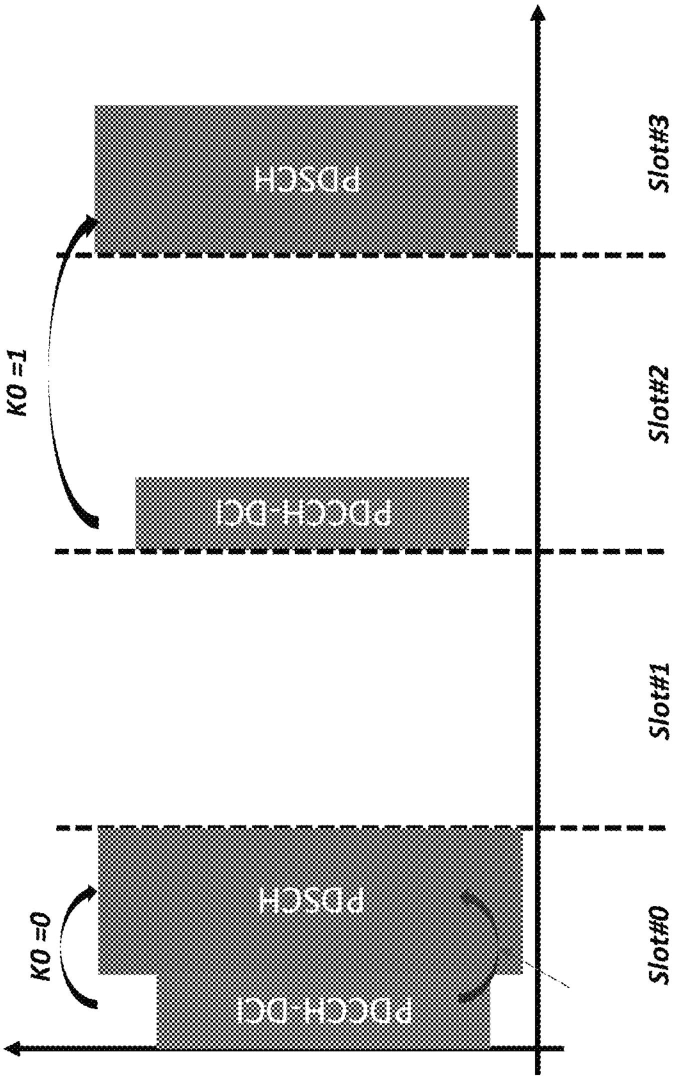
FIG. 2B illustrates one example of cross-slot scheduling under the 3GPP standard.

FIG. 2B illustrates one example of cross-slot scheduling according to the 3GPP standard, using the radio frame structure as depicted in FIG. 2A. The cross-slot scheduling as depicted in FIG. 2B has been introduced as a UE power saving technique. This cross-slot technique is applied to UEs, when UEs are in a Radio Resource Control (RRC)-connected mode. The cross-slot scheduling technique facilitates UEs to perform micro-sleep cycles and reduce Physical Downlink Control Channel (PDCCH) processing which may reduce power consumption by UEs. While a UE is in the RRC-connected mode, the UE has to continuously monitor all downlink slots of a subframe to check for incoming data. This process involves UE decoding of PDCCH in each slot to check for a grant notification. The grant notification indicates that data will be scheduled to a particular UE in a consecutive Physical Downlink Shared Channel (PDSCH). PDCCH is a physical channel that carries Downlink Control Information (DCI), which has several major functionalities, such as carrying the information to allocate physical resources for downlink data (PDSCH).

With a standard LTE/5G radio frame condition, as depicted in FIG. 2A, a base station (eNodeB/gNodeB) can schedule UE data in any of 20 slots that carry PDSCH elements. UE data grant and PDSCH data can be scheduled in several slots of the frames, as depicted in FIG. 2B. Based on the PDCCH-DCI format, the UE can derive a value of a slot offset, "K0". In the downlink direction, the slot offset, between a slot at which the UE received the DCI via a PDCCH channel and a slot at which data resource is scheduled to be received, is denoted as "K0." More specifically, K0 can range from {0-32} according to the 3GPP standard. As depicted in FIG. 2B, data can be scheduled in the same slot of the PDCCH-DCI, i.e. "K0=0." This is referred to as the "same slot scheduling." As depicted in FIG. 2B, slot #0 is subject to the same slot scheduling. Conversely, data can be scheduled after or a consecutive slot of the PDCCH-DCI, i.e., "k0>0". This is referred to as "cross-slot scheduling." As depicted in FIG. 2B, slots #2 and #3 depict the situation where data (PDSCH) is scheduled at slot #3 with respect to PDCCH-DCI received at slot #2, where K0=1. Small bursty downlink traffic may be scheduled to the UE in several consecutive slots/subframes. Under these circumstances, the UE will be forced to decode constantly PDCCH-DCI and PDSCH channels for grants and data respectively. This situation may not facilitate efficient UE power saving. As depicted in FIG. 2B, the UE will not be able to enter micro-sleep (K0=0), or micro-sleeps may be too small (K0=1), due to consecutive UE data grants in the same frame.

When the UE is scheduled to receive PDSCH by a PDCCH-DCI grant, a time domain resource assignment field of the PDCCH-DCI provides a row index of a higher layer configured table pdsch-symbolAllocation, where the indexed row defines the slot offset "K0", starting symbol "S", the allocation length "L", and the mapping type of PDSCH, as shown below.

38.214 v15.2.0 (2018-07) - Table 5.1.2.1.1-2: Default PDSCH time domain resource allocation A for normal CP

| Row index | dmrs-TypeA-Position | PDSCH mapping type | $K_0$ | S | L |
|---|---|---|---|---|---|
| 1 | 2 | Type A | 0 | 2 | 12 |
| | 3 | Type A | 0 | 3 | 11 |
| 2 | 2 | Type A | 0 | 2 | 10 |
| | 3 | Type A | 0 | 3 | 9 |
| 3 | 2 | Type A | 0 | 2 | 9 |
| | 3 | Type A | 0 | 3 | 8 |
| 4 | 2 | Type A | 0 | 2 | 7 |
| | 3 | Type A | 0 | 3 | 6 |
| 5 | 2 | Type A | 0 | 2 | 5 |
| | 3 | Type A | 0 | 3 | 4 |
| 6 | 2 | Type B | 0 | 9 | 4 |
| | 3 | Type B | 0 | 10 | 4 |
| 7 | 2 | Type B | 0 | 4 | 4 |
| | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

The base station (e.g., gNodeB) configures the time domain resource assignment field in PDCCH-DCI, which is sent to the UE via SIB1 or dedicated RRC signalling. Once the UE is configured with the time domain resource assignment by the serving gNodeB, the UE will constantly monitor PDCCH-DCI and decode pdsch-TimeDomainAllocationList to check for a data grant indicator and a corresponding "K0", "S", "L" parameters. The slot offset K0 allows the resource allocation to be scheduled in a specific number of slots in the future (K0>0), or for the resource allocation to be scheduled within the same current slot (K0=0). If the K0 field is absent in the pdsch-TimeDomainAllocationList, the UE will assume that all PDSCH allocations will occur in the same slot where the PDCCH allocating PDSCH is. $K_0$ PDSCH-TimeDomainResourceAllocation is an IE (Information Element) of PDSCH-Config and PDSCH-ConfigCommon. It is defined as an element (a kind of array element) of an IE called pdsch-AllocationList. Once this array (pdsch-AllocationList) is defined in RRC message, which elements of the array is used for each PDSCH scheduling is determined by the field called Time domain resource assignment in DCI 1_0 and DCI 1_1.

for cases of "same slot scheduling," i.e., K0=0. The UE may still be reading PDCCH-DCI while PDSCH is being received. To avoid this delay, the UE has to buffer PDSCH data of all the slot and read PDSCH data offline. The UE will then determine if data was scheduled for it in any of the PDSCH data resource of the concurrent slots. In many of the cases, there may not be data scheduled for the UE in the buffered PDSCH, which can lead to wasteful power consumption for the UE. Moreover, in the absence of K0 parameter, the UE will also assume that data may be scheduled for it in any of the PDSCH data resource of the concurrent slots, which may also result in another layer of wasteful power consumption.

The cross-slot scheduling technique can be used as a UE power saving technique, as the UE is allowed to perform micro sleep cycles and reduce the PDCCH processing which may yield to reducing UE power consumption. When the cross-slot scheduling technique is used, the gNodeB utilizes a "K0>0" value to allow the UE to enter into micro sleep for "K0" slots. The longer the "K0" is, the longer the micro-sleep becomes and therefore, higher UE power savings can be achieved. Long "K0" may induce a transmitting delay, which may impact some application quality of service (QOS) requirements. Small bursty downlink traffic may be scheduled to the UE in several consecutive slots/subframes. Under these circumstances, the UE will be forced to decode constantly PDCCH-DCI and PDSCH channels for grants and data respectively. This situation will not allow efficient UE power saving. The 3GPP does not provide recommendations for configuring the cross-slot scheduling technique and the correlation with data scheduling.

Figure 2C:
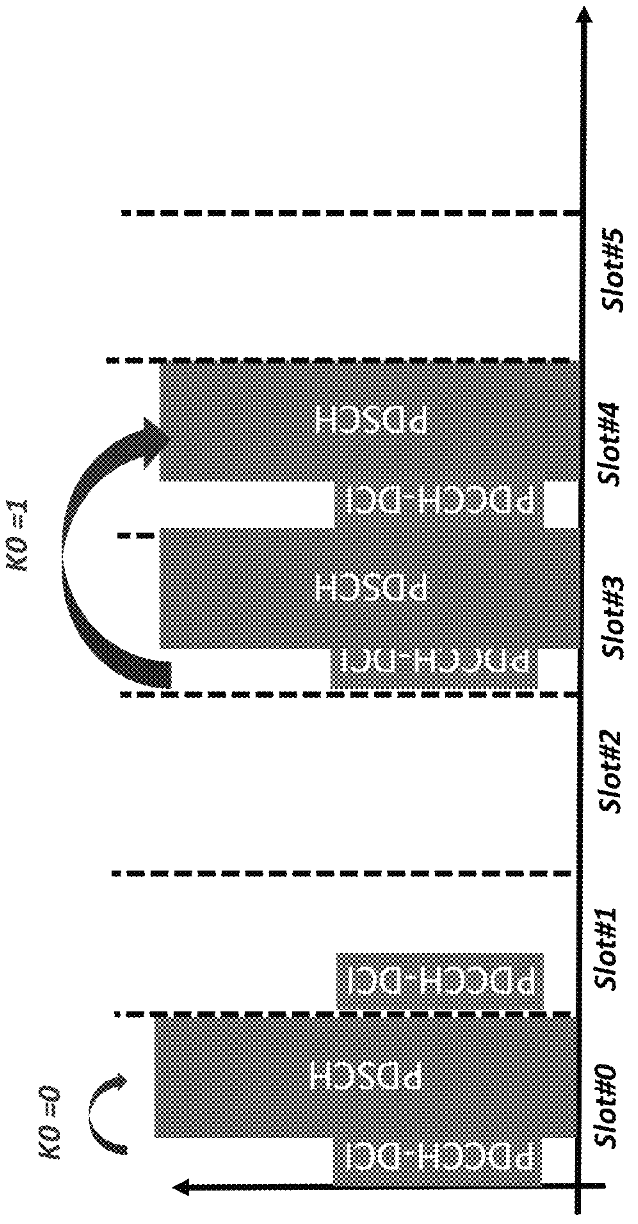
FIG. 2C illustrates another example of cross-scheduling under the 3GPP standard.

A standard LTE/5G radio frame is 10 milliseconds in length, and is divided into 10 subframes of 1 millisecond, which are in turn divided into two slots of 0.5 milliseconds. Following these calculations, each radio frame is 20 slots in length, with each slot being 7 symbols in length, with each symbol being 0.071428 ms (0.5/7) in length. FIG. 2C illustrates another example of cross-scheduling according to the 3GPP standard, where micro-sleeps are small, such as K0=0, or K0=1. The standard LTE/5G radio frame condition, as depicted in FIG. 2A, a gNodeB can schedule UE data in any of the 20 slots that carry PDSCH elements. UE data grant and PDSCH-data can be scheduled in several slots of the frame, as shown in FIG. 2C. In this example of FIG. 2C, the UE will either not able to enter micro-sleep (K0=0) or micro-sleeps are too small (K0=1), due to consecutive UE data grants in the same frame.

```
PDSCH-TimeDomainResourceAllocation-r16 ::= SEQUENCE {
  k0-r16                         INTEGER(0..32) OPTIONAL, -- Need S
  mappingType-r16                ENUMERATED {typeA, typeB},
  startSymbolAndLength-r16       INTEGER (0..127),
  repetitionNumber-r16           ENUMERATED {n2, n3, n4, n5, n6,
n7, n8, n16}
OPTIONAL,--Cond Formats1-0and1-1
  ...,
  [[
  k0-v1710 INTEGER(33..128)      OPTIONAL -- Need S
  ]]
}
```

Figure 2D:
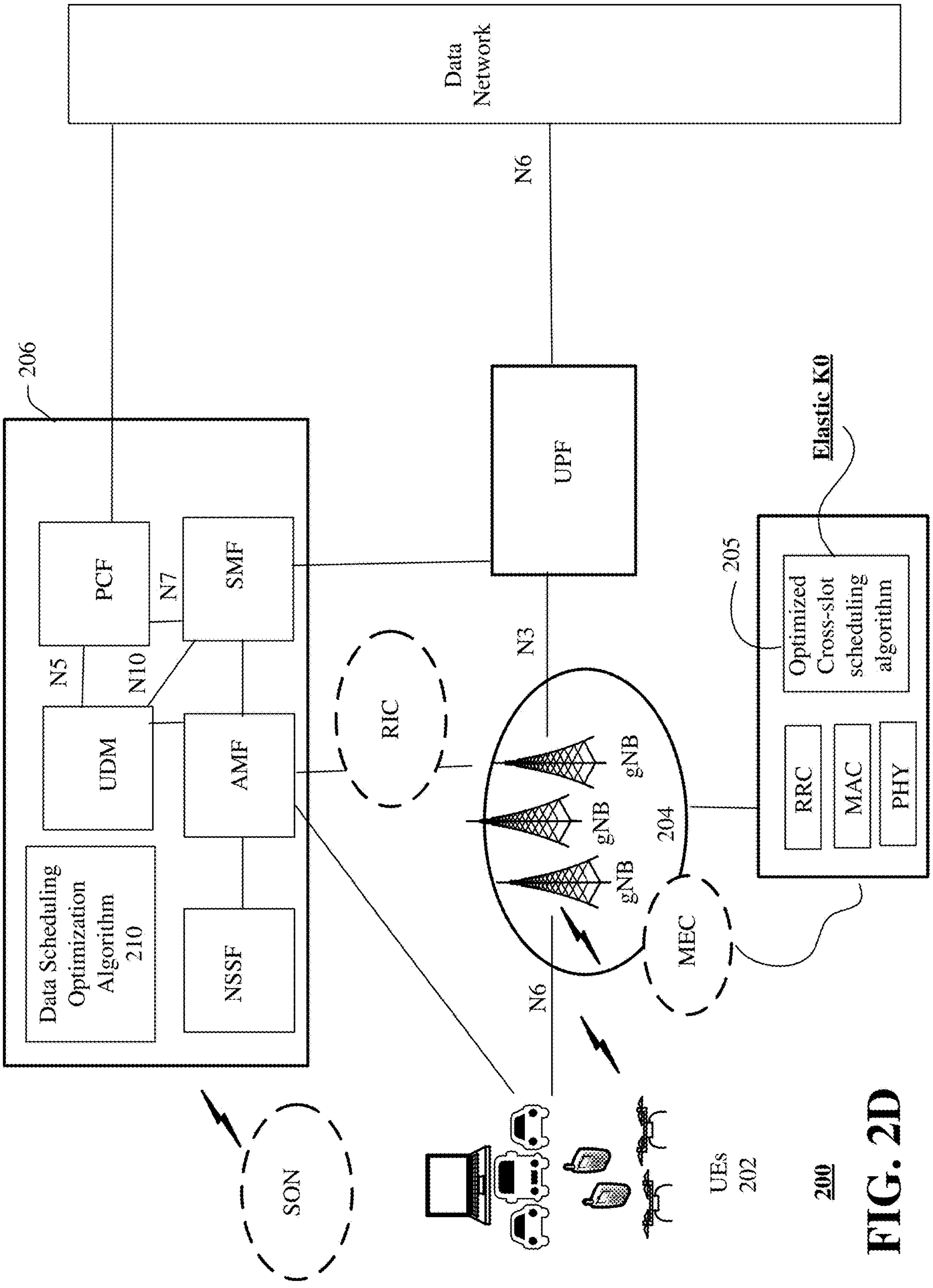
FIG. 2D is a block diagram illustrating an example, non-limiting embodiment of a system functioning within the communication network of FIG. 1 in accordance with various aspects described herein.

The cross-slot scheduling scenarios may induce additional transmitting delay for the UE, as the UE will have wait "K0" slots to decode the data after receiving the corresponding data grant. However, the UE can enter into a micro-sleep stage during this period of time to conserve energy. Therefore, there is a delay associated with decoding PDCCH-DCI FIG. 2D is a block diagram illustrating an example, non-limiting embodiment of a system 200 for optimizing micro sleep cycles of a user equipment functioning within the communication network of FIG. 1 in accordance with various aspects described herein. In various embodiments, the system 200 optimizes data scheduling in the downlink direction aiming to improve UE power savings by means of micro sleeps. The system 200 can be placed at a central node global control located on the core network, i.e., Mobile Edge Compute (MEC), Self-Organized Network (SON), or Radio Access Network Intelligent Controller (RIC).

In various embodiments, the system 200 includes various user equipment (UE) 202 connected to an access network 204 including a plurality of base stations (gNBs). The access network 204 is connected to a user plane function (UPF). The UPF forwards traffic between the base stations and a data network such as the Internet. The UPF is handling policy enforcement, traffic usage measurement, quality of service (QOS) policing, etc.

In various embodiments, the system 200 further includes a control plane 206 that represents functions that are unique to the 5G mobile control plane. In the 5G networks, examples of functions provided by, or included, in the control plane 206 include an access mobility function (AMF) configured to facilitate mobility management in a control plane of the network system (including, for instance, providing UE mobility information associated with the access network(s) 204 and/or UEs 202 to the control plane 206), a Unified Data Management (UDM) function, a Session Management Function (SMF), a policy control function (PCF), and/or the like. The system 200 may be in communication with one or more other networks (e.g., one or more content delivery networks (CDNs)), one or more services, and/or one or more devices. In one or more embodiments, the control plane 206 may include one or more devices implementing other functions, such as a master user database server device for network access management, a PDN gateway server device for facilitating access to a PDN, and/or the like. The control plane 206 may include various physical/virtual resources, including server devices, virtual environments, databases, and so on. The control plane 206 includes other network functions which are not limited to the network functions described herein.

In certain embodiments, the access network 204 may be implemented as a virtual RAN, where radio/wireline functions are implemented as general-purpose applications/apps that operate in virtualized environments and interact with physical resources either directly or via full/partial hardware emulation. Virtualized software radio applications can be delivered as a service and managed through a cloud controller. Here, base stations may be implemented as (e.g., passive) distributed radio elements connected to a centralized baseband processing pool. In some embodiments, the access network 204 may include, or communicate with, a RAN intelligent controller (RIC).

In various embodiments, the system 200 can provide services to various types of UEs 202. Examples of UEs 202 include mobile devices, display and television devices, home and business networks, IoT devices, video and audio devices, autonomous vehicles, unmanned aerial vehicles (UAVs), and so on. The UEs 202 may be equipped with one or more transmitter (Tx) devices and/or one or more receiver (Rx) devices configured to communicate with, and utilize network resources of, the system 200. Various types of UEs 202 may operate in battery constrained environments and/or situations. Energy savings and reducing power consumption can be an important part in operations of UEs 202.

UAVs may include any (e.g., manually controllable or autonomous) personal or commercial aerial vehicle or device that is equipped with one or more types of devices or components for performing various actions. In certain embodiments, UAVs may include one or more radio equipment configured to function as a cellular relay (e.g., low-powered cellular radio access (or small cell) node(s)), one or more sensors (e.g., image sensor(s), infrared sensor(s), near infrared camera(s), radar system(s), light detection and ranging (LIDAR) system(s), biological sensor(s), temperature sensor(s), chemical sensor(s), humidity sensor(s), and/or the like) for capturing information/data in an environment of UAVs, one or more mechanical limbs for physically manipulating external objects, and/or the like. In some embodiments, one or more UAVs may be deployed to provide network connectivity for other UE(s). In certain embodiments, UAVs may provide network connectivity by way of wireless "tethering" to (e.g., a base station or the like of) an access network like the access network 204 or a different access network (i.e., one that is not experiencing a traffic surge condition) and/or via a wired link (e.g., over a fiber connection) to a network device (e.g., edge computing device or the like) that has a backhaul connection to the mobile network platform. UAVs may, additionally, or alternatively, communicate data (e.g., control data, user data, etc.) via the wireless tethering or wired link.

In various embodiments, the UEs 202 may run or support different applications. Some applications require a low latency and are very sensitive to any type of delay, such as voice services (e.g., VOIP). The low latency application may not require power saving. Other applications may be more tolerant to a delay but require high power savings. Based on applications running or supported by the UEs 202 and/or different types of the UEs 202, power saving requirements and quality of service (QOS) constraints may vary. In some cases, the power saving requirements may need to be focused, even though QoS constraints may be somewhat compromised. In other cases, QoS constraints may be the most critical factor by limiting the power saving requirements to some extent. Balancing between the power saving requirements and the QoS constraints may differ and vary depending on types of UEs and types of applications running by UEs.

As depicted in FIG. 2D, the access network 204 uses the Radio Resource Control (RRC) protocol and includes other components such as a Media Access Control (MAC) function and a physical layer (PHY). Functions of the RRC protocol include connection establishment and release functions, broadcast of system information, radio bearer establishment, reconfiguration and release, paging notification and release, etc. By signaling functions, the RRC configures user and control planes according to the network status and allows for radio resource management strategies to be implemented.

In various embodiments, the access network 204 including the base station may include a wireless radio access network (RAN), a Wi-Fi network, and/or a wireline network. In exemplary embodiments, the access network 204 may be implemented in open source software (e.g., in an OpenAirInterface (OAI) wireless technology platform). The access network 204 may include network resources, such as one or more physical access resources and/or one or more virtual access resources. Physical access resources can include base station(s) (e.g., one or more eNodeBs, one or more gNodeBs, or the like, such as base stations), one or more satellites, one or more Gigabyte Passive Optical Networks (GPONs) or related components (e.g., Optical Line Terminal (s) (OLT), Optical Network Unit(s) (ONU), etc.), and/or the like. A base station may employ any suitable radio access technology (RAT), such as 4G/LTE, 5G, 6G, or any higher generation RAT. One or more edge computing devices (e.g., multi-access edge computing (MEC) devices or the like) may also be included in or associated with the access network 204. Virtual access resources can include a voice service system (e.g., a hardware and/or software implementation of voice-related functions), a video service system (e.g., a hardware and/or software implementation of video-related functions, such as coder-decoder or compression-decompression (CODEC) components or the like), a security service system (e.g., a hardware and/or software implementation of security-related functions), and/or the like. In one or more embodiments, the access network 204 may include any number/types of physical/virtual access resources and various types of heterogeneous cell configurations with various quantities of cells and/or types of cells.

In various embodiments, the system 200 implements a mechanism that optimizes data scheduling in the downlink direction aiming to improve UE power savings by means of micro-sleeps. The mechanism can be implemented as a logic included in a central node global control located on the core network. As depicted in FIG. 2D, the control plane 206 includes a data scheduling optimization algorithm 210 that implements the mechanism for optimizing data scheduling in the downlink direction to UEs. Additionally, or alternatively, the access network 204 includes an improved and optimized cross-slot scheduling algorithm 205.

In various embodiments, the data scheduling optimization algorithm 210 may be implemented in a centralized network hub or node device at, or proximate to, an edge of a network provider's overall network. In some embodiments, the data scheduling optimization algorithm 210 can be implemented in a Multi-access Edge Computing (MEC) device or devices. As the name/nomenclature implies, a MEC device may reside at a location that is at, or proximate, to an edge of the network system, which may be useful in reducing (e.g., minimizing) delays associated with provisioning of data or services to one or more (requesting) devices. In some embodiments, the data scheduling optimization algorithm 210 may additionally, or alternatively, be implemented in a Self-Organizing Network (SON) or other similar network that provides automatic planning functions, configuration functions, optimization functions, diagnostic functions, and/or healing functions for a network. In some embodiments, the data scheduling optimization algorithm 202 may additionally, or alternatively, be implemented in a RIC or other similar device or device(s) that leverage data analytics and machine learning and/or artificial intelligence to provide resource management capabilities, such as mobility management, admission control, and interference management, at an edge of a network.

In various embodiments, the data scheduling optimization algorithm 210 will mandate the base station (e.g., the gNodeB) to buffer downlink data and schedule to the UE in clusters. By sending data in clusters to the UE, it is more likely that the UE will stay longer in a micro-sleep stage, and therefore may achieve higher power saving. The base station and the UE will use cross-slot scheduling with an elastic "K0" parameter for each UE, considering and balancing power saving requirements and QoS constraints. The base station will configure cross-slot scheduling for each UE, assuming the UE supports this feature. The data scheduling optimization algorithm 210 will then collect UE power saving requirements and QoS constraints for each these UEs/Applications. The data scheduling optimization algorithm 210 will compute a unique "K0" parameter for each UE aiming to achieve power saving requirements while maintaining QoS constraints. The parameter, "K0" is sent by the base station (e.g., gNB) to the UE in PDCCH-DCI. The parameter, "K0" is considered elastic, as it may vary in time based on QOS requirements and required power saving.

In various embodiments, a unique "K0" parameter will be computed for each UE aiming to achieve power saving requirements while maintaining QoS constraints. For instance, if the UE requires high power savings and allow high transmitting delay (e.g., IoT), then data packets should be held and try to be scheduled in "clusters" aiming to place them all together after "K0" slots where PDCCH-DCI is received. The UE will read the data-grant on PDCCH-DCI and perform a micro sleep for "K0," as shown below. As another example, if the UE is running a delay sensitive application (i.e. VoIP) and does not require power savings, then the data scheduling optimization mechanism should use small "K0" (i.e., K0=0).

Additionally, or alternatively, the parameter, "K0" may be selected based on a subscriber's choice or a subscriber's level of subscription. For instance, a subscriber may have an option to request ultra low latency services and the parameter, "K0" can be selected to facilitate ultra low latency services. In some embodiments, subscribers' status or a priority level may matter. By way of example, subscribers can be first responders and associated with emergency services which are given with a highest priority. Overall, the parameter, "K0" may vary to accommodate and facilitate the QoS requirements, the required power saving, types of UEs, types of applications running by UEs, subscribers' requests, or other variables/factors relevant to the network operation.

Figure 2E:
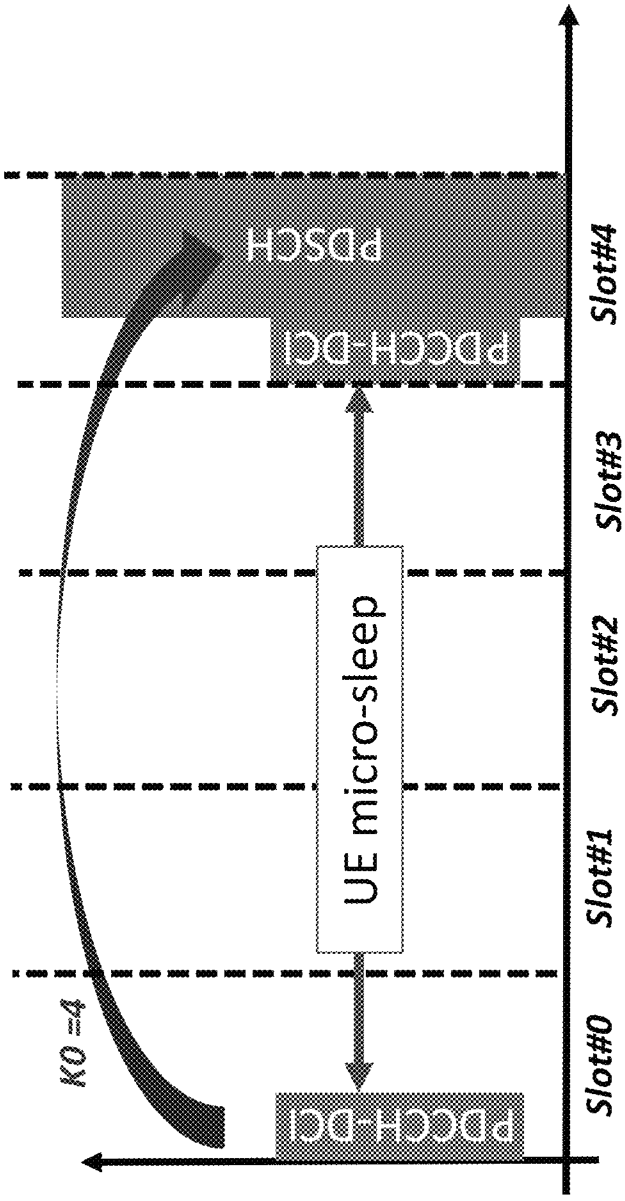
FIG. 2E depicts an illustrative embodiment of cross-slot scheduling in accordance with various aspects described herein.

FIG. 2E illustrates an example, non-limiting embodiment of an intelligent/dynamic cross-slot scheduling mechanism to achieve efficient power savings at an application level. In this example, the data scheduling optimization algorithm 210 sends a data grant in PDCCH-DCI at slot #0, and sends UE data in a cluster in slot #4, i.e. "K0=4". The UE data may occupy the entire PDSCH of slot #4 or may even a consecutive PDSCH slot (e.g., slot #5).

A first data packet of the cluster of packets for this UE may have arrived at the base station at time "t0" and the last packet of the cluster at time "t1" at the base station. The data grant for this cluster sent to the UE in PDCCH-DCI of slot #0 was sent at time "2" (where t2>t1>t0), and finally the data cluster as delivered to the UE in PDSCH at slot #4 at time "t2+K0." Therefore, this approach may induce a delay "t2+K0"−"t0." However, the UE can achieve a "K0"−1 micro-sleep. The data scheduling optimization algorithm 210 may need to decide the size and duration of the data cluster, i.e. "t1−t0". It is assumed that the base station will deliver the data cluster right after the data cluster is created, i.e., t2−t1. Therefore, an induced delay can be estimated as "t1+K0−t0"=Δ+K0, where Δ~{t1−t0} (a data cluster duration). Finally, the induced delay has a direct correlation to the cluster duration/size and the cross-slot scheduling "K0" parameter. Large Δ may imply large data cluster size, and thus data cluster may be allocated in more than 1 slot. In these cases, the data scheduling optimization algorithm 210 may need to use "L>1" ("L" is the allocation length of the cross-slot scheduling).

In various embodiments, the data scheduling optimization algorithm 210 will contrast high power saving requirements against QoS constraints at a UE/Application level when selecting or configuring the parameter, "K0." For instance, delay sensitive application (i.e. VoIP) may receive "K0=0", while IoT devices may receive relatively large "k0" than zero. Other cases can be interpolated in between.

In various embodiments, the data scheduling optimization mechanism according to various embodiments herein can enhance the current 3GPP UE power saving mechanism, thereby benefiting power-constrained devices, such as IoT devices and wearable devices. The data scheduling optimization mechanism according to various embodiments herein can make the network configuration more elastic and less static or rigid, which can be applied to other radio access technologies.

In various embodiments, the data scheduling optimization mechanism according to various embodiments herein can also be used to include additional Information Elements (IE) in the pdsch-TimeDomainAllocationList object to provide information about a periodicity of sending a next UE data grant after a number of slots (i.e. x-slots). The current pdsch-TimeDomainAllocationList is reproduced below.

```
PDSCH-TimeDomainResourceAllocation-r16 ::= SEQUENCE {
  k0-r16                          INTEGER(0..32) OPTIONAL, -- Need S
  mappingType-r16                 ENUMERATED {typeA, typeB},
  startSymbolAndLength-r16        INTEGER (0..127),
  repetitionNumber-r16            ENUMERATED {n2, n3, n4, n5, n6,
n7, n8, n16}
OPTIONAL,-- Cond Formats1-0and1-1
  ...,
  [[
  k0-v1710 INTEGER(33..128)       OPTIONAL -- Need S
  ]]
}
```

After the UE decodes the data including additional IE indicative of a number of slots (e.g., x-slots), the UE will go sleep for x-slots. When the UE wakes up, the UE will read the data grant from PDCCH-DCI, and if the data grant is not present for this UE, it will go back to sleep for other x-slots. The base station will have to hold data packets for x-slots to send the PDCCH-DCI data grant, then hold extra "K0" slots to send the actual data that is scheduled to the UE. The data scheduling optimization mechanism will require modifications of the existing 3GPP specification to allow new Information Elements (IE) in the cross-slot scheduling object. This extension may provide extra power savings.

In various embodiments, the network may leverage cross slot scheduling IE (legacy or revised version, or any other UE power saving IE) for network energy saving purposes. Current 5G Advanced (R18+) network energy saving IEs may not be backward compatible, which likely requires new development by infrastructure and chipsets. Leveraging R15-17 UE power saving IEs, which may be reported from UE to the network, the network may decide whether a "majority of IEs" need low power modem during certain time period, e.g. mid-late night. Such learning could benefit the network to adjust network energy savings. Learning on a single cell, a single site or a single cluster could be extended by using and checking on neighboring cells. Cells in a cluster will exchange such information via an X2 interface between the base stations. This may potentially impact RAN3 working group definition.

Figure 2F:
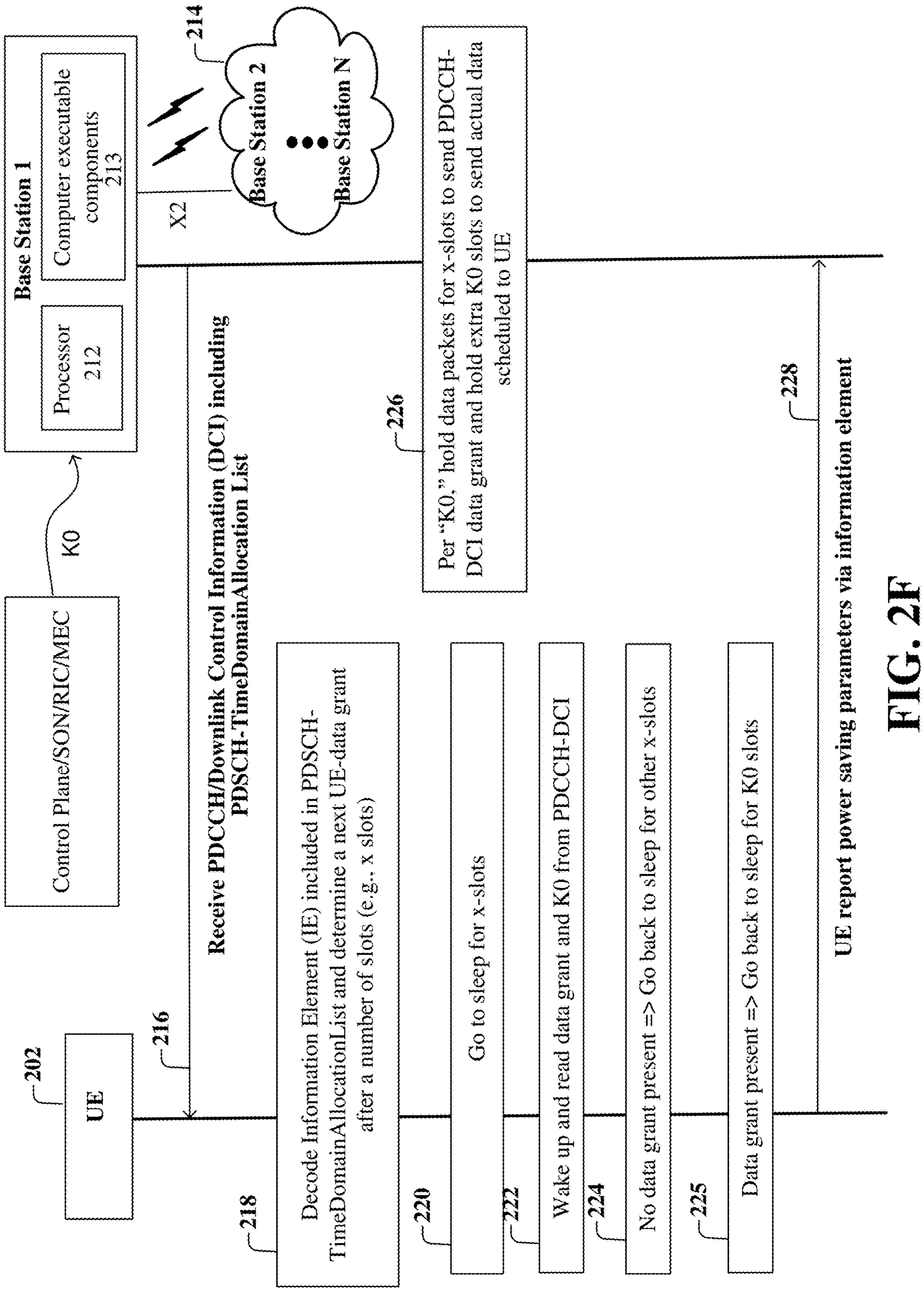
FIG. 2F depicts an illustrative embodiment of cross-slot scheduling including an additional information element in accordance with various aspects described herein.

FIG. 2F depicts an illustrative embodiment of cross-slot scheduling including an additional information element in accordance with various aspects described herein. In various embodiments, the control plane 206 implements the data scheduling optimization algorithm 210 computes a unique slot offset value or parameter "K0" for each UE aiming to achieve power saving requirements while maintaining QoS constraints. The slot offset value or parameter "K0" is elastic as the slot offset value or parameter varies for each UE and/or application running on each UE. For instance, UEs such as IoT devices may have larger slot offset value. For high response sensitive applications, a lower or smaller slot offset value or parameter can be used. The unique slot offset value or parameter "K0" is sent to the access network 204 including Base Station 1. The Base Station 1 includes a processor 212 and computer executable instructions 213. The Base Station 1 and the UE 202 are mandated to use the cross-slot scheduling with elastic K0 parameter for each use. The K0 parameter is sent from Base Station 1 to the UE 202 in PDCCH-DIC (Act 216). The pdsch-TimeDomainAllocationList object includes the K0 parameter and additional information elements which indicates a next UE data grant after a number of slots (e.g., x slots). The UE 202 decodes information element (IE) included in PDSCH-TimeDomainAllocationList and determines a next UE-data grant after a number of slots (e.g., x slots) (Act 218). The UE 202 goes to sleep for x slots (Act 220). The UE 202 wakes up and read a data grant from PDCCH-DCI (action 222). If no data grant is present, the UE 202 will go back to sleep for another x-slots (action 224). If there is a data grant and for instance, if K0 corresponds to "4," then the UE 202 goes to sleep for K0=4 and wakes up after (x+4) slots (Act 225). Based on "K0" parameter or value, Base Station 1 holds data packets for x slots to send the PDCCH-DCI data grant and holds extra K0 slots (e.g., 4 slots) to send actual data scheduled to the UE 202 (Act 226).

In various embodiments, the UE 202 reports power saving parameters via information element (action 228). UEs 202, connected to a cell, can collect and provide data relevant to "K0" parameter or value, which can be used for learning or forming a knowledge base with respect to UE power savings. Based on the learning or the knowledge base with respect to the UE power savings, the network learns and adjusts corresponding configurations. For instance, during a certain time (e.g., 1 am through 6 am), a majority of UEs, such as cellular phones, may not be in an active use state and UEs can request a component carrier reduction. UEs are not in active use and kept to have a basic connection with the network. The network may learn such behavior of a majority of UEs during that time period and can adjust operations, for example, by reducing a component carrier and letting radio equipment in inactive mode or sleep mode. Such adjustment of the network can be done without creating some new standards specification which may not be compatible with older products backward.

Additionally, or alternatively, the network may learn association among UEs, the "K0" parameter or value, certain services or applications and determine what would benefit the network side the most. The network may self-learn or self-adjust by considering time slot of the day, predictable events (e.g., a big festival underway), a coverage location (residential area, commercial area, etc.). In addition to the side of UEs, the network may be configured for energy savings and reduced power consumption. In order to implement the self-learning and self-adjustment processes, the network may utilize artificial intelligence/machine learning techniques to learn from a large amount of relevant data and make relevant predictions. As described above, the relevant data may be collected and provided by UEs. Additionally, data related to various events, configurations, network environments, network operations, etc. can be fed to the network.

In various embodiments, neighboring cells may broadcast or exchange information and establish collaboration among neighboring cells via an extra interface such as X2. For instance, one cell may broadcast or share data relating to values of the parameter "K0" associated with certain types of UEs and/or certain types of applications with a neighboring cell. The neighboring cell can store and utilize such information for UEs connected to the neighboring cell. Among cells covering a certain geographical location, or run by a particular service providers, such information can be broadcast and shared.

Figure 2G:
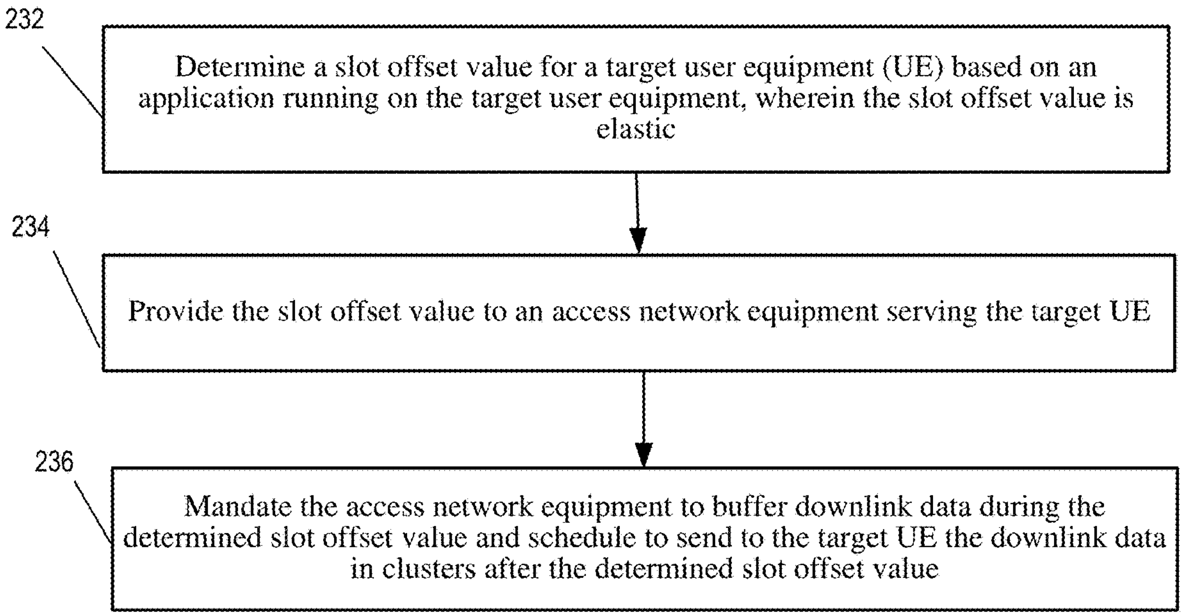
FIG. 2G depicts an illustrative embodiment of a method in accordance with various aspects described herein.

FIG. 2G depicts an illustrative embodiment of a method 230 in accordance with various aspects described herein. The method 230 includes determining a slot offset value for a target user equipment (UE) based on an application running on the target user equipment, wherein the slot offset value is elastic (Step 232), providing the slot offset value to an access network equipment serving the target UE (Step 234), and mandating the access network equipment to buffer downlink data during the determined slot offset value and schedule to send to the target UE the downlink data in clusters after the determined slot offset value (Step 236).

In various embodiments, the determining the slot offset value further includes computing the slot offset value based on power saving requirements and quality of service constraints required by the target UE, the application running on the target UE or both. The determining the slot offset value further comprises, in response to a high power saving and a normal or high latency application, determining the slot offset value to be a first value, and in response to a low latency application, determining the slot offset value to be a second value, wherein the first value is greater than the second value. The determining the slot offset value further comprises, in response to a first type of the target UE, determining the slot offset value to be a third value, and in response to a second type of the target UE, determining the slot offset value to be a fourth value, wherein the third value is different from the fourth value. The first type of the target UE include an internet of thing (IoT) device and the second type of the target UE includes a mobile phone, and the third value is greater than the fourth value. During a time period corresponding to the slot offset value, the target UE is triggered to enter into a micro-sleep stage to facilitate energy savings, and the determining the slot offset value further comprises adjusting the slot offset value to optimize a duration of the micro-sleep stage for the target UE based on the application running on the target user equipment.

Figure 2H:
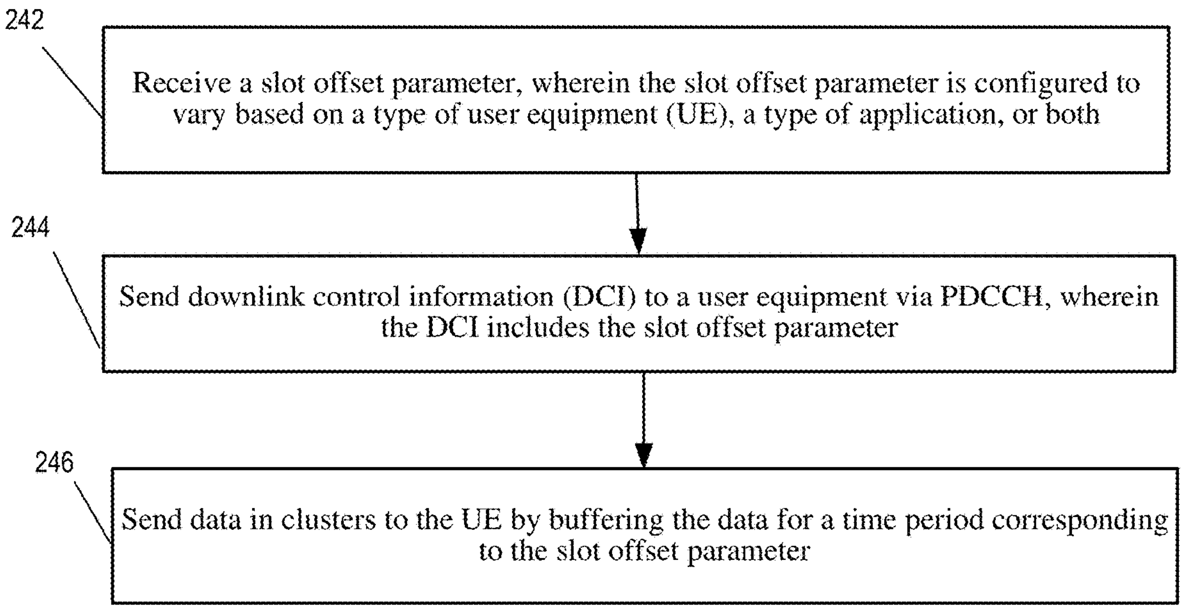
FIG. 2H depicts an illustrative embodiment of another method in accordance with various aspects described herein.

FIG. 2H depicts an illustrative embodiment of another method 240 in accordance with various aspects described herein. In various embodiments, the method 240 includes receiving a slot offset parameter, wherein the slot offset parameter is configured to vary based on a type of user equipment (UE), a type of application, or both (Step 242), sending downlink control information (DCI) to a user equipment via PDCCH, wherein the DCI includes the slot offset parameter (Step 244), and sending data in clusters to the UE by buffering the data for a time period corresponding to the slot offset parameter (Step 246).

In various embodiments, the method 240 further include receiving, from the UE, power saving requirements and quality of service constraints for the type of UE, the type of application or both. The sending data in clusters further includes holding the data for the time period corresponding to the slot offset parameter and scheduling the data in clusters to place the data in clusters together in a slot after a slot corresponding to the slot offset parameter. The sending the DCI further includes configuring a time domain resource assignment field in the DCI, and sending the DCI to the UE via SystemInformationBlockType 1 (SIB1) or dedicated Radio Resource Control (RRC) signalling. The sending the DCI further includes configuring the time domain resource assignment field to include an additional information element indicative of a periodicity of a UE data grant.

In various embodiments, the configuring the time domain resource assignment field further includes causing the UE to enter a micro sleep stage based on the periodicity of the UE data grant and during a time period corresponding to the slot offset parameter. The slot offset parameter for a delay sensitive application run on the UE is smaller than the slot offset parameter for a delay tolerable application run on the user equipment, wherein the delay sensitive application includes a voice service application. The method 240 further include determining a size and a duration of the data in clusters based on a first time that a first data packet of the data in clusters is received and a second time that a last packet of the data in clusters is received, and delivering, to the UE, the data in clusters right after the data in clusters are created.

Figure 2I:
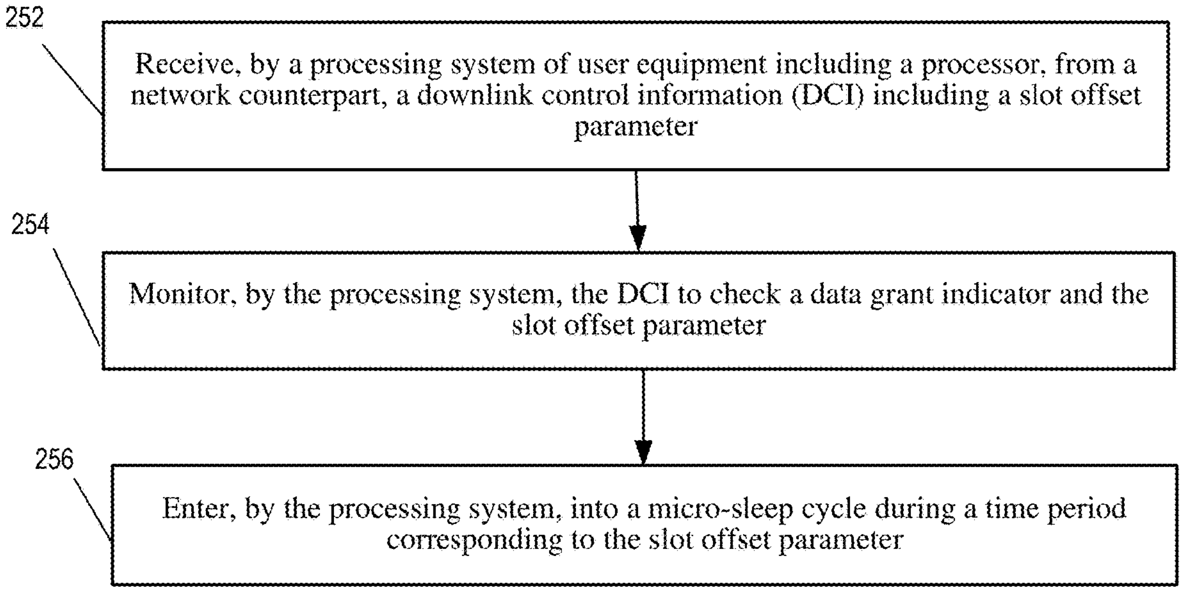
FIG. 2I depicts an illustrative embodiment of a further another method in accordance with various aspects described herein.

FIG. 2I depicts an illustrative embodiment of yet another method 250 in accordance with various aspects described herein. In various embodiments, the method 250 includes receiving, by a processing system of user equipment including a processor, from a network counterpart, a downlink control information (DCI) including a slot offset parameter (Step 252), monitoring, by the processing system, the DCI to check a data grant indicator and the slot offset parameter (Step 254), and entering, by the processing system, into a micro-sleep cycle during a time period corresponding to the slot offset parameter (Step 256).

In various embodiments, the method 250 further includes running, by the processing system, a low latency application, collecting and transmitting, by the processing system, information relating to the low latency application, and receiving, by the processing system, from the network counterpart, downlink data within a same slot that the DCI is received. The method 250 further includes running, by the processing system, a high latency application, collecting and transmitting, by the processing system, information relating to the high latency application, and receiving, by the processing system, from the network counterpart, downlink data after a slot corresponding to the slot offset parameter.

In various embodiments, the receiving the DCI including the slot offset parameter further comprises receiving the DCI including a time domain resource assignment field where an indexed row defines the slot offset parameter, a starting symbol, and an allocation length of downlink data. The method 250 further includes decoding, by the processing system, an information element to check for a data grant indicator and the slot offset parameter. The method 250 includes decoding, by the processing system, an information element indicative of a periodicity of a next UE data grant after a number of slots, upon the decoding of the information element, entering, by the processing system, into the micro-sleep cycle for the number of slots and waking up, when waking up, reading a data grant from the DCI, going back to the micro-sleep cycle for another number of slots if no data grant is present, and receiving, by the processing system, from the network counterpart, data packets held for the number of slots and the slot offset parameter.

While for purposes of simplicity of explanation, the respective processes are shown and described as a series of blocks in FIGS. 2F through 2I, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In embodiments descried above, the cross-slot scheduling mechanism may optimize data scheduling in the downlink direction aiming to improve UE power savings by means of micro-sleeps. The cross-slot scheduling mechanism according to various embodiments herein mandate the base station to buffer downlink data and schedule to the UE in "clusters." By sending data in clusters to the UE, it is more likely that UE will stay longer in a micro-sleep stage, and therefore achieve higher power saving. The service aware intelligent/dynamic cross-slot scheduling mechanism may achieve efficient power savings at an application level. Accordingly, the elastic network configuration can be offered to allow micro-sleep cycles for power consumption optimization.

In the embodiments described herein, the data scheduling optimization system and method implement service aware intelligent/dynamic cross-slot scheduling mechanism to achieve efficient power savings at the application level. Elastic network configuration facilitates micro-sleep cycles for power consumption optimization and will serve as a main component for future network automation and optimization platforms. The data scheduling optimization system and method may require modifications of the existing 3GPP specification to allow new Information Elements (IE) in the cross-slot scheduling object. The data scheduling optimization system and method can serve as a key differentiator among wireless operators to provide higher power saving, while maintaining application requirements. The data scheduling optimization system and method may provide individual user experience enhancement by customized cross-slot scheduling mechanisms for battery-constrained 5G/6G Systems.

Figure 3:
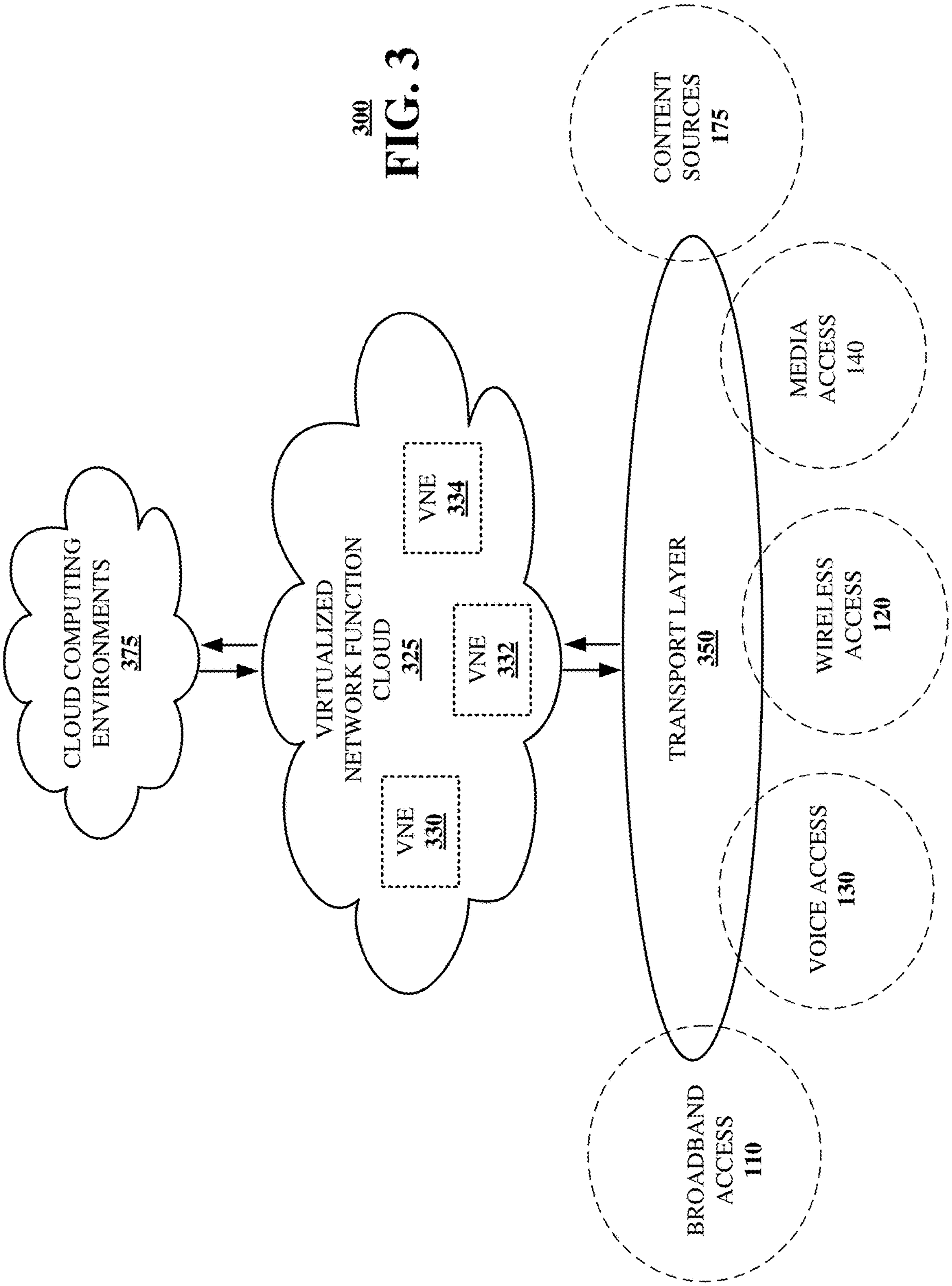
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3. For example, virtualized communication network 300 can facilitate in whole or in part systems and methods for optimizing micro-sleep cycles of user equipment for energy savings.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
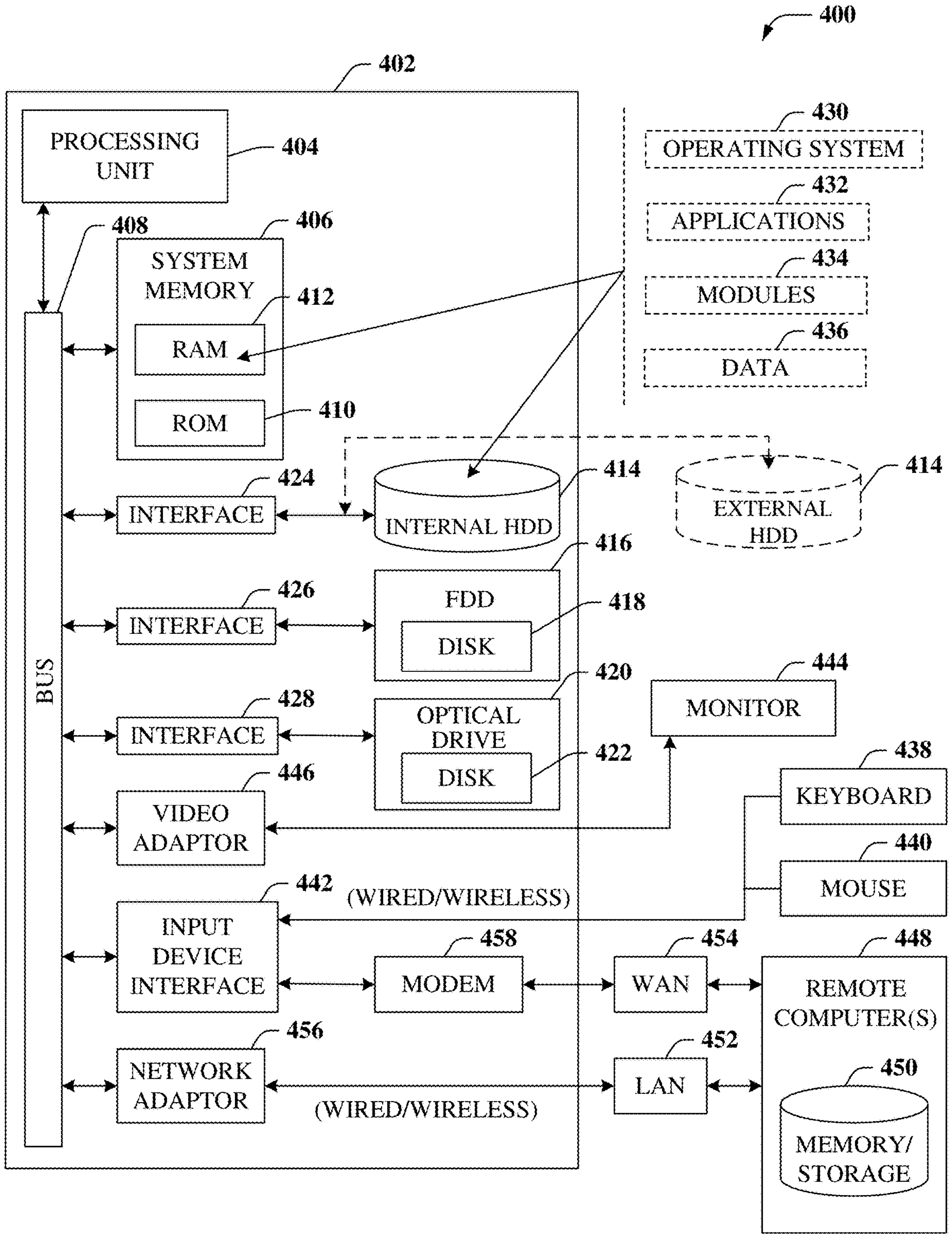
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part systems and methods for optimizing micro-sleep cycles of user equipment for energy savings.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
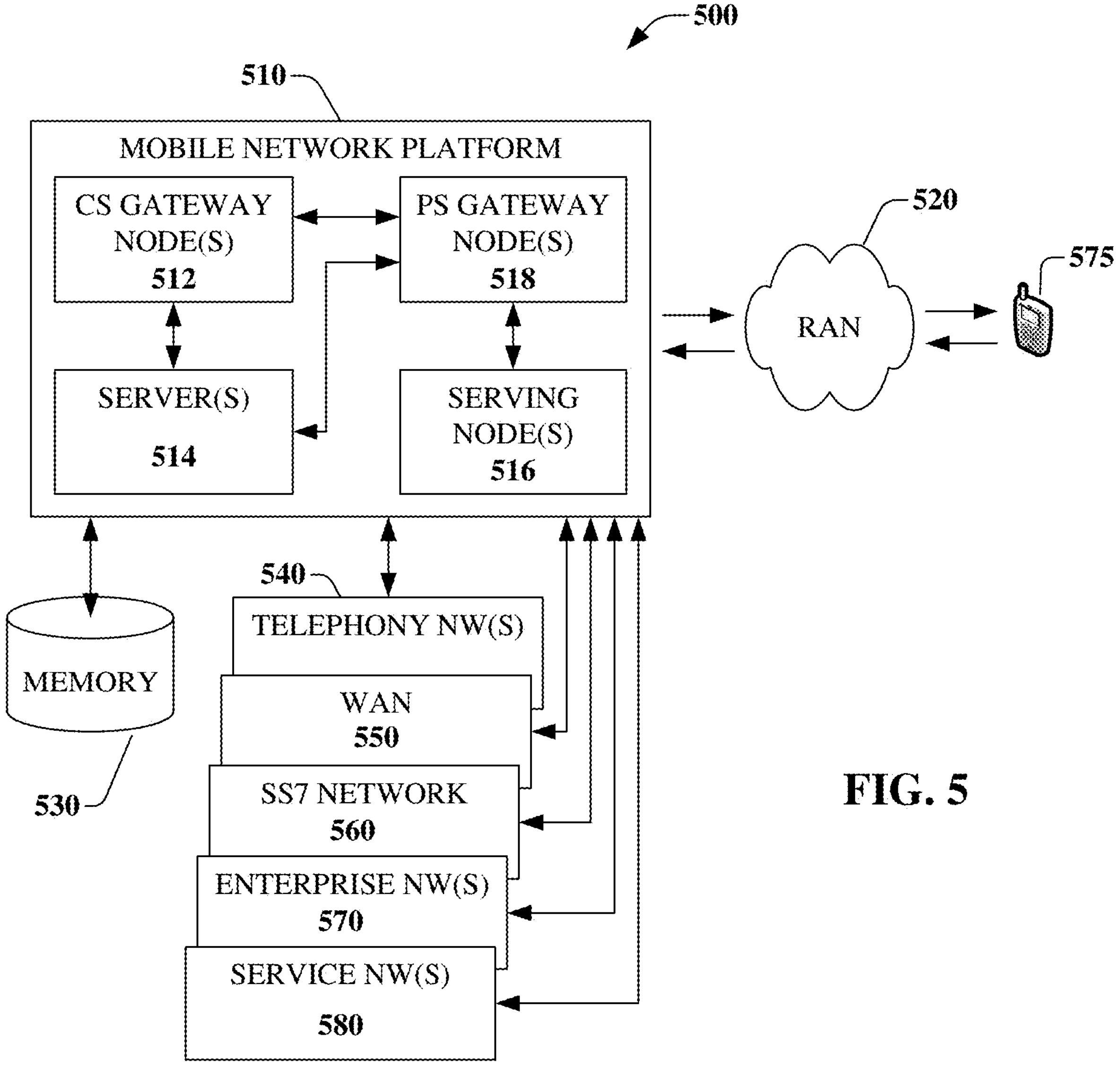
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part systems and methods for optimizing micro-sleep cycles of user equipment for energy savings. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
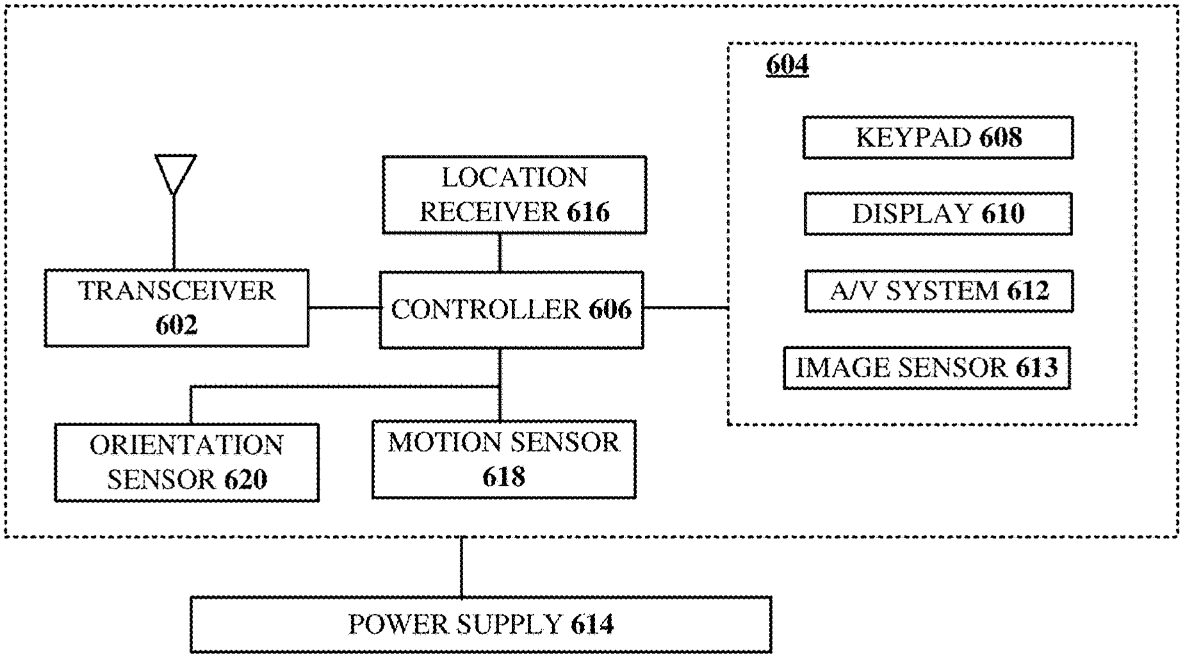
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part systems and methods for optimizing micro-sleep cycles of user equipment for energy savings.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

determining a slot offset value for a target user equipment (UE) based on an application running on the target user equipment, wherein the slot offset value is elastic;

providing the slot offset value to an access network equipment serving the target UE; and mandating the access network equipment to buffer downlink data during the determined slot offset value and schedule to send the target UE the downlink data in clusters after the determined slot offset value.

2. The device of claim 1, wherein the determining the slot offset value further comprises computing the slot offset value based on power saving requirements and quality of service constraints required by the target UE, the application running on the target UE or both.

3. The device of claim 2, wherein the determining the slot offset value further comprises, in response to a high power saving and a normal or high latency application, determining the slot offset value to be a first value, and in response to a low latency application, determining the slot offset value to be a second value, wherein the first value is greater than the second value.

4. The device of claim 1, wherein the determining the slot offset value further comprises, in response to a first type of the target UE, determining the slot offset value to be a third value, and in response to a second type of the target UE, determining the slot offset value to be a fourth value, wherein the third value is different from the fourth value.

5. The device of claim 4, wherein the first type of the target UE include an internet of thing (IoT) device and the second type of the target UE includes a mobile phone, and the third value is greater than the fourth value.

6. The device of claim 1, wherein, during a time period corresponding to the slot offset value, the target UE is triggered to enter into a micro-sleep stage to facilitate energy savings, and the determining the slot offset value further comprises adjusting the slot offset value to optimize a duration of the micro-sleep stage for the target UE based on the application running on the target UE.

7. A non-transitory machine-readable medium, comprising executable instructions that, when executed by a processing system of an access network equipment including a processor, facilitate performance of operations, the operations comprising:

receiving a slot offset parameter, wherein the slot offset parameter is configured to vary based on a type of user equipment (UE), a type of application, or both, and wherein the slot offset parameter is elastic;

sending downlink control information (DCI) to a user equipment via PDCCH, wherein the DCI includes the slot offset parameter; and sending data in clusters to the UE by buffering the data for a time period corresponding to the slot offset parameter.

8. The non-transitory machine-readable medium of claim 7, wherein the operations further comprise receiving, from the UE or a network, power saving requirements and quality of service constraints for the type of UE, the type of application or both.

9. The non-transitory machine-readable medium of claim 7, wherein the sending data in clusters further comprises holding the data for the time period corresponding to the slot offset parameter and scheduling the data in clusters to place the data in clusters together in a slot after a slot corresponding to the slot offset parameter.

10. The non-transitory machine-readable medium of claim 7, wherein the sending the DCI further comprises:

configuring a time domain resource assignment field in the DCI; and sending the DCI to the UE via SystemInformationBlockType 1 (SIB1) or dedicated Radio Resource Control (RRC) signalling.

11. The non-transitory machine-readable medium of claim 10, wherein the sending the DCI further comprises configuring the time domain resource assignment field to include an additional information element indicative of a periodicity of a UE data grant.

12. The non-transitory machine-readable medium of claim 11, wherein the configuring the time domain resource assignment field further comprises causing the UE to enter a micro sleep stage based on the periodicity of the UE data grant and during a time period corresponding to the slot offset parameter.

13. The non-transitory machine-readable medium of claim 7, wherein the slot offset parameter for a delay sensitive application run on the UE is smaller than the slot offset parameter for a delay tolerable application run on the user equipment, wherein the delay sensitive application includes a voice service application.

14. The non-transitory machine-readable medium of claim 7, wherein the operations further comprise:

determining a size and a duration of the data in clusters based on a first time that a first data packet of the data in clusters is received and a second time that a last packet of the data in clusters is received; and delivering, to the UE, the data in clusters right after the data in clusters are created.

15. A method, comprising:

receiving, by a processing system of user equipment including a processor, from a network counterpart, a downlink control information (DCI) including a slot offset parameter, wherein the slot offset parameter is elastic;

monitoring, by the processing system, the DCI to check a data grant indicator and the slot offset parameter;

entering, by the processing system, into a micro-sleep cycle during a time period corresponding to the slot offset parameter; and receiving, by the processing system, from the network counterpart, downlink data buffered by the network counterpart during the time period corresponding to the slot offset parameter, wherein the downlink data are sent in clusters after the time period corresponding to the slot offset parameter.

16. The method of claim 15, comprising:

running, by the processing system, a low latency application;

collecting and transmitting, by the processing system, information relating to the low latency application; and receiving, by the processing system, from the network counterpart, downlink data after a slot corresponding to the slot offset parameter, wherein the slot offset parameter is either zero or close to zero such that the downlink data is within a same slot that the DCI is received.

17. The method of claim 15, comprising:

running, by the processing system, a high latency application;

collecting and transmitting, by the processing system, information relating to the high latency application; and receiving, by the processing system, from the network counterpart, downlink data after a slot corresponding to the slot offset parameter, wherein the slot offset parameter for the high latency application has a medium or large value compared to the slot offset parameter for a low latency application which is either zero or close to zero.

18. The method of claim 15, wherein the receiving the DCI including the slot offset parameter further comprises receiving the DCI including a time domain resource assignment field where an indexed row defines the slot offset parameter, a starting symbol, and an allocation length of downlink data.

19. The method of claim 15, further comprising:

decoding, by the processing system, an information element to check for a data grant indicator and the slot offset parameter.

20. The method of claim 15, comprising:

decoding, by the processing system, an information element indicative of a periodicity of a next UE data grant after a number of slots;

upon the decoding of the information element, entering, by the processing system, into the micro-sleep cycle for the number of slots and waking up;

when waking up, reading, by the processing system, a data grant from the DCI;

going, by the processing system, back to the micro-sleep cycle for another number of slots if no data grant is present; and receiving, by the processing system, from the network counterpart, data packets held for the number of slots and the slot offset parameter.

* * * * *